(12) United States Patent
Stockman (10) Patent No.: US 11,215,438 B2
(45) Date of Patent: *Jan. 4, 2022

(54) MULTIPLE DISPLAY ELECTRONIC CALIPER

(71) Applicant: Dynamic Engineering Innovations, Inc., Palm Coast, FL (US)

(72) Inventor: Robert M. Stockman, Palm Coast, FL (US)

(73) Assignee: Dynamic Engineering Innovations, Inc., Palm Coast, FL (US)

( * ) Notice: Subject to any disclaimer, the term of this patent is extended or adjusted under 35 U.S.C. 154(b) by 53 days.

This patent is subject to a terminal disclaimer.

(21) Appl. No.: 16/047,628

(22) Filed: Jul. 27, 2018

(65) Prior Publication Data

US 2019/0195610 A1 Jun. 27, 2019

Related U.S. Application Data

(63) Continuation of application No. 15/070,314, filed on Mar. 15, 2016, now Pat. No. 10,054,417, which is a
(Continued)

(51) Int. Cl.
*G01B 5/02* (2006.01)
*G01B 3/20* (2006.01)
*G06F 3/023* (2006.01)

(52) U.S. Cl.
CPC ............. *G01B 5/02* (2013.01); *G01B 3/205* (2013.01); *G06F 3/023* (2013.01); *G01B 3/20* (2013.01); *G01B 2210/58* (2013.01)

(58) Field of Classification Search
CPC . G01B 5/02; G01B 3/205; G01B 3/20; G01B 2210/58; G06F 3/023
See application file for complete search history.

(56) References Cited

U.S. PATENT DOCUMENTS 776,897 A * 12/1904 Ferris ................. B43L 9/04
33/27.03
3,973,113 A 8/1976 Goldsamt
(Continued)

FOREIGN PATENT DOCUMENTS

JP 2002202119 7/2002
WO WO 2008/024530 4/2008

OTHER PUBLICATIONS

"Fluke 45 Dual Display Multimeter." Fluke Corporation online <http://us.fluke.com/usen/products/Fluke+45.htm?catalog_name=FlukeUnitedStates.> Accessed on Oct. 24, 2006, 2 pages.
(Continued)

*Primary Examiner* — Nimeshkumar D Patel
*Assistant Examiner* — Tania Courson
(74) *Attorney, Agent, or Firm* — Fish & Richardson P.C.

(57) ABSTRACT

In addition to other aspects disclosed, a caliper is configured to measure at least one physical dimension. The caliper has a display configured to present a first representation and a second representation of a measurement provided by the caliper. The format of the first representation is different from the format of the second representation, and the first representation is approximately simultaneously displayed with the second representation.

20 Claims, 6 Drawing Sheets

Related U.S. Application Data continuation of application No. 13/662,753, filed on Oct. 29, 2012, now Pat. No. 9,316,474, which is a continuation of application No. 13/273,380, filed on Oct. 14, 2011, now Pat. No. 8,296,965, which is a continuation of application No. 12/848,376, filed on Aug. 2, 2010, now Pat. No. 8,037,616, which is a continuation of application No. 11/969,832, filed on Jan. 4, 2008, now Pat. No. 7,765,712.

(60) Provisional application No. 60/883,687, filed on Jan. 5, 2007.

(56) References Cited

U.S. PATENT DOCUMENTS

| | | | | |
|---|---|---|---|---|
| D257,012 | S | 9/1980 | Sibukawa et al. | |
| 4,228,516 | A * | 10/1980 | Johnston, Sr. | G06F 15/0258 341/110 |
| 4,506,450 | A * | 3/1985 | Fleming | G01C 9/06 33/348 |
| 4,586,260 | A | 5/1986 | Baxter et al. | |
| 4,642,899 | A | 2/1987 | Fass et al. | |
| 4,676,634 | A * | 6/1987 | Petersen | G01C 15/006 33/293 |
| 4,744,044 | A | 5/1988 | Stover et al. | |
| 4,800,514 | A | 1/1989 | Earle | |
| 4,825,147 | A | 4/1989 | Cook et al. | |
| 4,860,233 | A | 8/1989 | Pitchford | |
| 5,122,733 | A | 6/1992 | Havel | |
| 5,136,285 | A | 8/1992 | Okuyama | |
| 5,272,653 | A * | 12/1993 | Meta | G06F 15/0258 708/137 |
| 5,293,221 | A * | 3/1994 | Kitajima | G01C 15/006 33/293 |
| 5,404,317 | A | 4/1995 | Song et al. | |
| 5,571,431 | A | 11/1996 | Lantieri et al. | |
| 5,592,745 | A | 1/1997 | Heger et al. | |
| 5,687,487 | A * | 11/1997 | Johnson | G01B 7/345 33/501.02 |
| 5,771,598 | A | 6/1998 | Lassberg | |
| 5,841,274 | A | 11/1998 | Masreliez et al. | |
| 5,875,557 | A * | 3/1999 | Ueki | G01B 3/004 33/476 |
| 5,956,260 | A * | 9/1999 | Heger | G01C 9/06 33/391 |
| 6,145,207 | A * | 11/2000 | Brunson | G01B 3/205 33/199 B |
| 6,195,668 | B1 | 2/2001 | Toyosawa et al. | |
| 6,205,672 | B1 | 3/2001 | Paulsen et al. | |
| 6,223,136 | B1 | 4/2001 | Geiger | |
| 6,279,248 | B1 | 8/2001 | Walters | |
| 6,332,278 | B1 | 12/2001 | Bezinge et al. | |
| RE37,490 | E | 1/2002 | Andermo et al. | |
| 6,502,057 | B1 | 12/2002 | Suzuki | |
| 6,574,582 | B1 | 6/2003 | Geiger | |
| 6,721,623 | B1 * | 4/2004 | Diamond | G06F 15/0258 33/494 |
| 6,854,975 | B2 | 2/2005 | Ranzinger | |
| 7,013,763 | B2 * | 3/2006 | Hsien | B25B 13/12 81/165 |
| 7,207,121 | B2 | 4/2007 | Wixey | |
| D556,064 | S | 11/2007 | Yang et al. | |
| 7,373,735 | B2 | 5/2008 | Jacobs | |
| D574,278 | S | 8/2008 | Zhang | |
| 7,464,476 | B2 | 12/2008 | Le | |
| 7,506,452 | B1 | 3/2009 | Vanneman | |
| 7,530,177 | B1 | 5/2009 | Meichle et al. | |
| 7,580,804 | B2 | 8/2009 | Wixey | |
| 7,619,420 | B2 | 11/2009 | Stockman | |
| 7,765,712 | B2 | 8/2010 | Stockman | |
| 7,838,808 | B1 * | 11/2010 | Ake | G01J 1/0219 250/214 R |
| 8,037,616 | B2 | 10/2011 | Stockman | |
| 8,296,965 | B2 | 10/2012 | Stockman | |
| 9,212,883 | B2 | 12/2015 | Emtman et al. | |
| 9,267,779 | B2 | 2/2016 | Emtman et al. | |
| 9,316,474 | B2 | 4/2016 | Stockman | |
| 9,612,099 | B2 | 4/2017 | Emtman et al. | |
| 9,615,147 | B2 * | 4/2017 | Radosavljevic | G01R 22/065 |
| 9,678,701 | B2 | 6/2017 | Cook | |
| 9,689,653 | B2 | 6/2017 | Baskovic | |
| 9,739,801 | B2 | 6/2017 | Anderson | |
| 10,054,417 | B2 | 8/2018 | Stockman | |
| 2003/0233761 | A1 | 12/2003 | Erskine-Smith | |
| 2006/0137204 | A1 | 6/2006 | Yang | |
| 2006/0162178 | A1 | 7/2006 | Freidin | |
| 2008/0052942 | A1 | 3/2008 | Kawatoko | |
| 2008/0177503 | A1 | 7/2008 | Stockman | |
| 2010/0293802 | A1 | 11/2010 | Stockman | |
| 2012/0023768 | A1 | 2/2012 | Stockman | |
| 2013/0152419 | A1 | 6/2013 | Stockman | |
| 2016/0173962 | A1 | 6/2016 | Vance | |
| 2016/0313108 | A1 | 10/2016 | Stockman | |

OTHER PUBLICATIONS

"Logging Multimeter." Galco Industrial Electronics Inc. online <http://www.galco.com/scripts/cgiip.exe/WA/Wcat/itemdtl.htm?pnum=189-FLKE&source.> Accessed on Oct. 24, 2006, 1 page.

"MM/Inch Dial Caliper C." RS Components Pty Ltd. online <http://www.rsaustralia.com/cgi-bin/bv/rswww/searchBrowseAction.do?com.broadvision.> Accessed on Oct. 24, 2006, 3 pages.

"Starrett 6" Dial Caliper with Fraction Graduations. Shopping.com online <http://www.shopping.com/xPO-Starrett_Starrett_6_Dial_Caliper_with_Fraction_Gradtuatons.> Accessed Oct. 24, 2006, 3 pages.

* cited by examiner

MULTIPLE DISPLAY ELECTRONIC CALIPER

CLAIM OF PRIORITY

This application is a continuation of and claims priority under 35 U.S.C. § 120 to U.S. patent application Ser. No. 15/070,314 filed on Mar. 15, 2016, which is a continuation of and claims priority under 35 U.S.C. § 120 to U.S. patent application Ser. No. 13/662,753 filed on Oct. 29, 2012, now U.S. Pat. No. 9,316,474, which is a continuation of and claims priority under 35 U.S.C. § 120 to U.S. patent application Ser. No. 13/273,380 filed on Oct. 14, 2011, now U.S. Pat. No. 8,296,965, which is a continuation of and claims priority under 35 U.S.C. § 120 to U.S. patent application Ser. No. 12/848,376 filed on Aug. 2, 2010, now U.S. Pat. No. 8,037,616, which is a continuation of and claims priority under 35 U.S.C. § 120 to U.S. patent application Ser. No. 11/969,832 filed on Jan. 4, 2008, now U.S. Pat. No. 7,765,712, which is a nonprovisional of and claims priority under 35 U.S.C. § 119(e) to U.S. Provisional Patent Application Ser. No. 60/883,687, filed on Jan. 5, 2007, the entire contents of each of which are hereby incorporated by reference.

TECHNICAL FIELD

This invention relates to an electronic caliper that presents information with multiple displays.

BACKGROUND

In conventional length measuring mechanical instruments, a vernier scale or a dial indicator is used to measure one or more dimensions. These conventional length measuring instruments present a possibility of misreading the instrument due to reading errors and user error (e.g., due to the eyesight of the user).

With the progression in the art of digital displays in various fields, digital displays have been progressively applied to various types of measuring instruments. Caliper devices are not an exception and there exists calipers with a digital display. However, a single display may only conveniently provide a single piece of information that may lead to inefficient use of the caliper device and may be another source of user error.

SUMMARY

In general, in some aspects of the disclosure, an apparatus includes a caliper configured to measure at least one physical dimension. The caliper has a display configured to present a first representation and a second representation of a measurement provided by the caliper. The format of the first representation is different from the format of the second representation, and the first representation is approximately simultaneously displayed with the second representation.

The format of the first representation may include a decimal format, a fractional format, etc. The format of the second representation may include a decimal format, a fractional format etc. and be different from the format of the first representation. The first format may have metric units and the second format may have U.S. units. The resolution of the first representation may be selectable. The format of the first representation may include a first measurement unit and the format of the second representation may include a second measurement unit, different from the first measurement unit. The apparatus may include an electronics package that includes a display. The display may include a unit indicator and a variance indicator. The electronics package may be configured to provide data representative of the first representation and the second representation to an external display module. A hardwire or wireless connection may be used to provide the data from the electronics package to the external display module.

In some aspects of the disclosure, a method is disclosed that simultaneously displays on a display of a caliper, a first representation and a second representation of a measurement provided by the caliper. The format of the first representation is different from the format of the second representation.

The caliper may provide data that represents the first representation and the second representation to an external display module. The format of the first representation may include one of a decimal format and a fractional format. The first format may have metric units and the second format may have U.S. units.

In some aspects of the disclosure, a computer program product encoded on a computer-readable medium is operable to cause a data processing apparatus to perform operations that include simultaneously displaying on a display of a caliper a first representation and a second representation of a measurement provided by the caliper. The format of the first representation is different from the format of the second representation.

The computer program product may be further operable to cause the data processing apparatus to perform operations that include providing data that represents the first representation and the second representation to an external display module. The format of the first representation may include a decimal format, a fractional format, etc. The first format may have metric units and the second format may have U.S. units.

DETAILED DESCRIPTION

Figure 1:
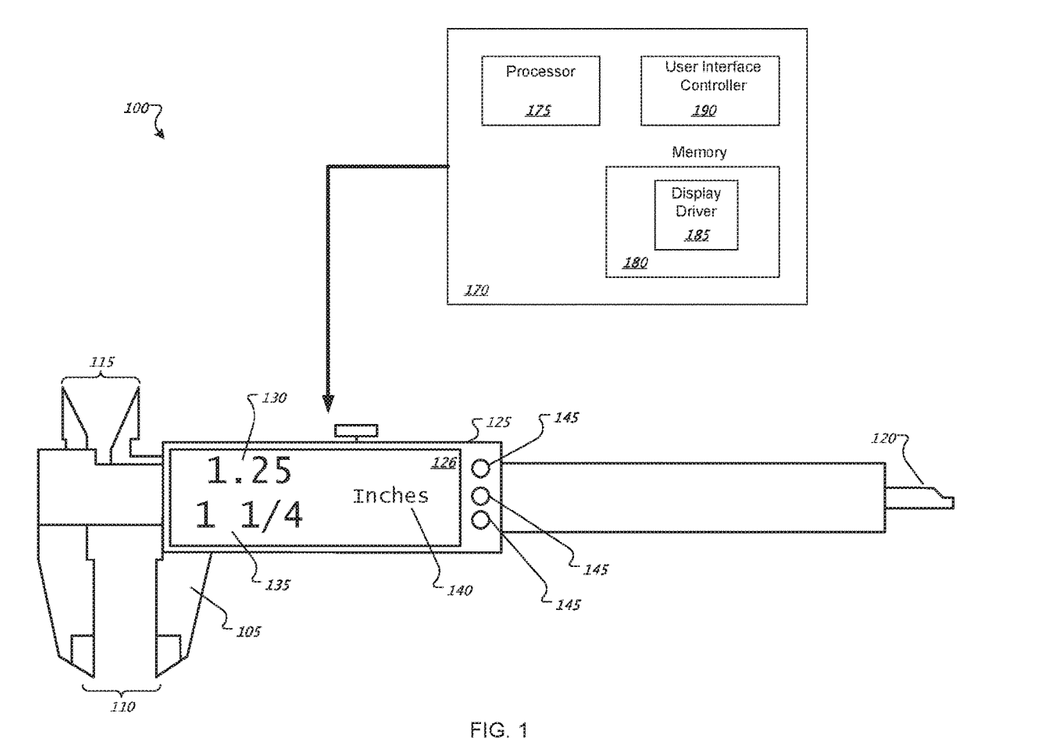
FIG. 1 illustrates an exemplary caliper.

FIG. 1 illustrates and example of an electronic caliper 100 that is capable of presenting information on two or more displays. For example, information representative of a caliper measurement may be simultaneously presented on the two or more displays. One or more techniques may be incorporated into the caliper 100 to provide a measurement. For example, the caliper 100 may include a main scale and an auxiliary scale whose relative movement to each other provides a measurement. In another implementation (referred to as a magnescale), a signal, which is produced due to the movement of scales relative to a magnetic tape, provides a measure of a dimension. In still another implementation, a caliper device may include an encoder that allows light to be directed toward an optical measuring device. A dimensional measurement is provided through a series of reflections based upon the caliper being placed in a measurement position.

In this particular implementation, the caliper 100 is capable of measuring the outside dimensions of objects using a set of outside jaws 105. Caliper 100 is also capable of measuring the inside dimensions of objects using a set of inside jaws 115. The caliper 100 also has a depth gauge 120 for measuring the depth of an object.

For producing a measurement, the caliper 100 includes an electronics package 125. The electronics package 125 is attached to the caliper 100 and performs functions associated with measurements along with other functions such as numerical calculations, preparing data for display, interfacing with other portions of the caliper 100, etc. The electronics package 125 has a display 126, which is capable of presenting at least two pieces of information that may be related or unrelated. For example, the display 126 may present two different representations of the measurement. In this illustration, the display 126 presents a decimal representation 130 of the current measurement in decimal form and a fractional representation 135 of the measurement in fractional form. The display 126 also displays, for example, a units indicator 140 that is capable of indicating the measurement units currently in use (e.g., inches, millimeters, etc.). The representation 130 and the representation 135 may be dedicated to the display of decimal or fractional numerical formats, or they may display either decimal and/or fractional formats interchangeably. In some embodiments, the display 126 may also be capable of presenting other types of representations in addition to those already described. These additional representations may be used to provide the user with a simultaneous display of, for example, a single measurement in inches in decimal form, inches in fractional form, millimeters in decimal form, etc.

In some embodiments, the display 126 may have additional units indicators similar to units indicator 140, in which each displayed representation may have an associated units indicator. For example, the display 126 may show a single measurement in two or more simultaneous representations, where each representation may be shown using different units of measurement (e.g., showing 1.00 inches and 25.4 millimeters) along with their respective units indicators.

The electronics package 125 may also include a group of buttons 145 (or other type of user interface) that may be used to control various operations and aspects of the caliper 100. These operations may include, for example, powering on or off the caliper's 100 electronics, selecting U.S. or metric units, selecting display configurations, selecting a decimal or fractional representation, resetting ("zeroing") the measurement, activating a backlight, etc.

In this implementation, the electronics package 125 includes a display controller 170, which may perform various computational tasks associated with the operation of the caliper 100. The display controller 170 may include components such as a processor 175, and a memory 180. The processor 175 may be implemented as one or more general purpose processors or processors customized for particular functions and operations. The memory 180 may be implemented, for example, in volatile or non-volatile memory (e.g., read-only memory (ROM), random access memory (RAM), dynamic RAM (DRAM), static RAM (SRAM)), etc. A user interface controller 190 may be included for collecting information and provide information for output (e.g., presentation on the display 126). For example, the user interface controller 190 may receive data from the collection of buttons 145 in order to provide the processor 175 with user input information, which may be used, for example, to modify the processor 175 operations. The user interface controller 190 may also individually, or in combination with the processor 175, assist with driving the display 126. The memory 180 may contain instructions, applications, data structures, data files or other types of information that may be used by the processor 175 and/or the user interface controller 190 to execute operations. In this implementation the memory 180 includes a display driver 185 that is executed by the processor 175 to control the presentation of information on the display 126. The display driver 185 may also assist in other operations such as reading measurement data and formatting the data for presentation on the display 126.

Figure 2:
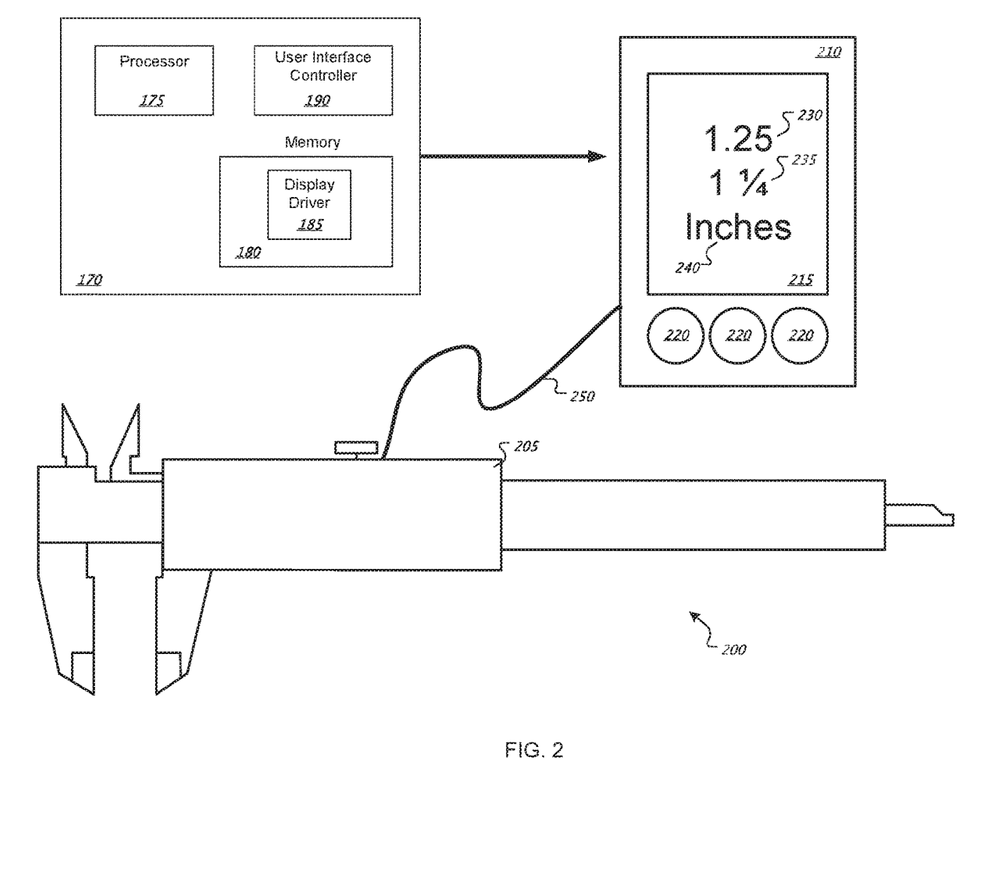
FIG. 2 illustrates an exemplary caliper.

FIG. 2 illustrates another exemplary electronic caliper 200 that is capable of simultaneously displaying two representations of a measurement. In this example, the caliper 200 comprises an electronics package 205 that is absent an onboard display. In this implementation, an external display module 210 is capable of displaying measurement information and user interactivity information. The display module 210 includes a display 215 and a collection of buttons 220. In this example, the external display module 210 also includes the display controller 170 that controls the presentation of information on the display 215 (along with other functions). In this implementation, the display controller 170, the collection of buttons 220 and the display 215 are located separate from the electronics package 205. However, in other implementations, one or more of the components may be included in the electronics package 205. The display 215 is capable of simultaneously presenting measurement information in multiple representations. In this illustration, the display 215 is simultaneously presenting a single measurement in both a decimal representation 230 and a fractional representation 235 along with a units indication 240. One or both of the representation 230 and the representation 235 may be dedicated to the display of decimal or fractional numerical formats, or they may display either decimal and/or fractional formats interchangeably. The units indication 240 presents the units of measurement that correlates to both representations 230 and 235, however, in some arrangements, each representation may be associated with one or more dedicated units indicators.

The electronics package 205 and the external display module 210 are linked by a electrical connection 250. The connection 250 is used to communicate electronic data and commands between the electronics package 205 and the external display module 210. For example, data representing one or more measurements performed by the caliper 200 may be sent via the electrical connection 250 to the external display module 210. The electrical connection 250 may include one or more communication techniques. For example, one or more hardwire connections (e.g., serial cable, parallel cable, etc.) may be implemented. Wireless techniques may also be used such as infrared (IR), radio frequency (RF), Bluetooth, ZigBee, wireless Ethernet, or other electromagnetic linking techniques. One or more protocols, transmission standards, and data formats may also be used for passing information between the electronics package 205 external display module 210. Along with data compression and encryption, data may be converted prior to being sent over the electrical connection 250. For example, data representing the caliper's measurement may be converted from into a digital signal or an analog signal (via an analog-to-digital (A/D) converter or a digital-to-analog (A/D) converter) prior to transmission.

Figure 3A:
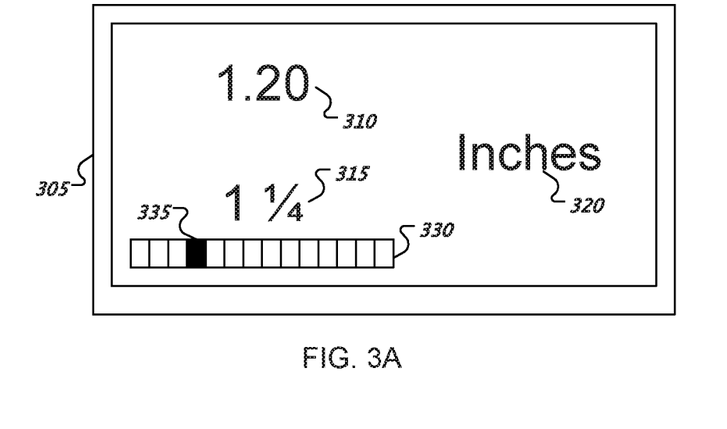
FIGS. 3A-3C illustrate exemplary displays.
Figure 3B:
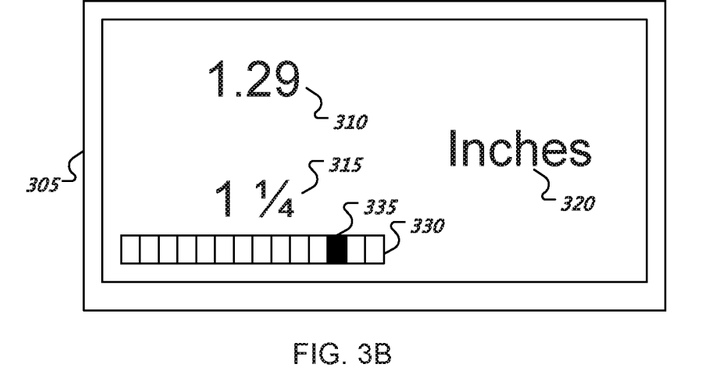

FIG. 3A and FIG. 3B illustrate an exemplary display 305 that presents a decimal representation 310 of a measurement value simultaneously with a fractional representation 315. A units indicator 320 displays the units of measure that are currently being displayed. The display 305 also includes a variance indicator 330 that is capable of showing a relative indication of the approximate difference between the fractional representation 315 and the exact measurement. In the example of FIG. 3A, the exact measurement displayed on the decimal representation 310 is 1.20 inches, however, the fractional representation 315 is set to display one-quarter inches as its finest resolution. As a result, the fractional representation 315 displays an approximation of the exact measurement; in this case, 1¼ inches. The variance indicator 330 in this example is embodied as a segmented bar, where the endpoints of the bar represent the midpoints to the next unit of resolution (for example, the left end would represent the displayed measurement minus ⅛ inch, and the right end would represent the measurement plus ⅛ inch), and the relative location of the exact measurement is represented by a highlighted segment 335. Since the exact measurement is less than the approximated fractional measurement 315, the variance indicator 330 is shown with the highlighted segment 335 to the left ("smaller") side of center.

FIG. 3B illustrates the same display 305, except in this example the exact measurement is slightly greater than the approximated fractional representation 315. In this example, the exact measurement is 1.29 inches but the current configuration for the fractional display 315 causes the fractional display 315 to display the approximated measurement as 1¼ inches. Since the exact measurement is greater than the approximated fractional measurement 315, the variance indicator 330 is shown with the highlighted segment 335 to the right ("larger") side of center. If the exact measurement were 1.25 inches, then the highlighted segment 335 would be shown in the center of the variance indicator 330.

Figure 3C:
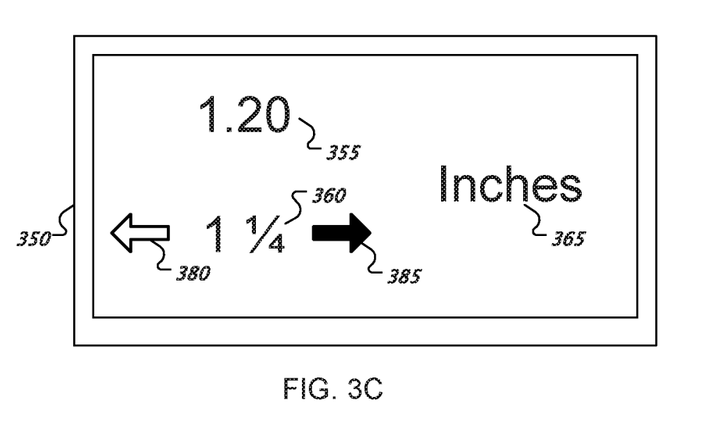

FIG. 3C illustrates an exemplary display 350 that comprises a decimal representation 355 of a measurement value simultaneously with a fractional representation 360. The units indicator 365 displays units of measure that are currently being displayed. In this example, variance between the exact measurement and the approximated fractional representation 360 is indicated by the left arrow 380 and a right arrow 385, which point in the direction between the current location and the indicated approximate fractional representation 360. For example, in the illustration, the exact measurement is 1.20 inches, as indicated by the decimal representation 355. However, the current configuration of the fractional representation 360 only allows for resolution of ¼ inch. In this case, the approximated fractional value displayed in the fractional representation 360 is larger than the exact decimal value displayed in the decimal representation 355, so the right arrow 385 is highlighted to indicate the direction in which the measurement would have to move in order to match the approximated fractional representation 360. In some other implementations, the arrows 380 and 385 may be highlighted in an inverse manner in order to indicate that the fractional representation's 360 value is larger or smaller than the decimal representation's 355 value.

Figure 4A:
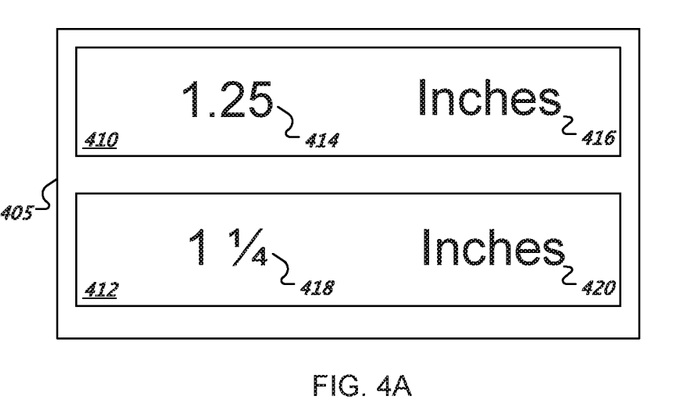
FIGS. 4A-4C illustrate exemplary displays.
Figure 4B:
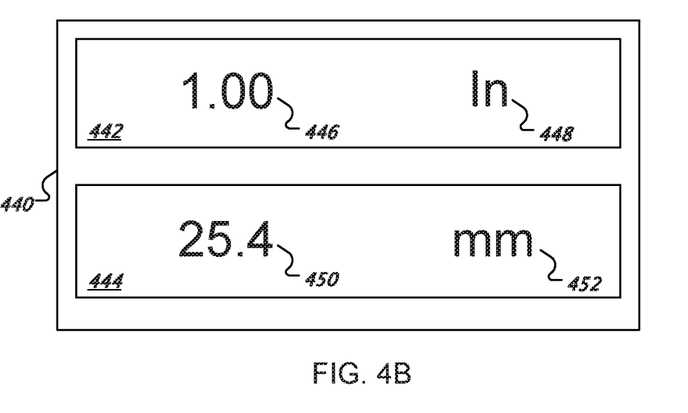
Figure 4C:
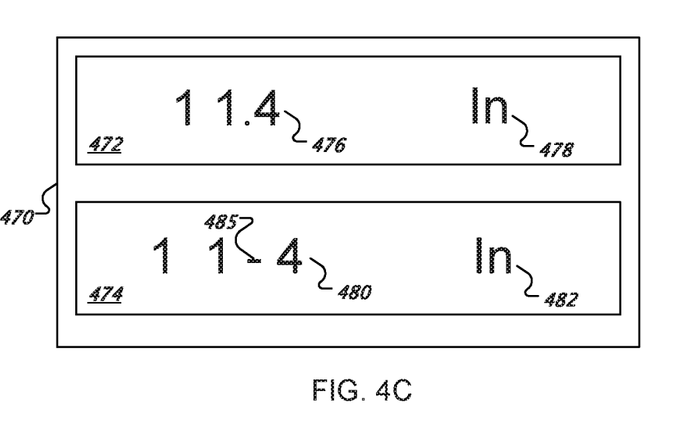

FIG. 4A, FIG. 4B, and FIG. 4C illustrate displays that implement multiple discrete display elements. FIG. 4A illustrates an exemplary display 405 that is capable of displaying both a decimal and factional representations of a measurement. In particular, the display 405 includes a decimal display 410 and a fractional display 412. The decimal display 410 includes a decimal representation 414 of the present measurement and a units indicator 416. The fractional display 412 includes a fractional representation 418 and a units indicator 420.

FIG. 4B illustrates an exemplary display 440 that includes two discrete displays, a first decimal display 442 and a second decimal display 444, which are capable of displaying a single measurement using two different measurement units. As illustrated, the first decimal display is configured to display measurements and units of inches, and the second display is configured to display measurements in units of millimeters. The first display 442 includes a first decimal display 446 and a units indicator 448. In this example the first units indicator 448 represents the measurement units as "inches" in an abbreviated form ("In"). The second display 444 includes a second a small display 450 and a second units indicator 452. In this example the second units indicator 452 represents the measurement units as "millimeters" in an abbreviated form ("mm"). In various embodiments, the display 440 may be capable of displaying other units of measurement such as microns, meters, feet, centimeters, and other well known or user defined units.

FIG. 4C illustrates an exemplary display 470 with two discrete displays, a decimal display 472 and a fractional display 474. The decimal display 472 includes a decimal representation 476 in a units indicator 478 that are similar to previously described displays. The fractional display 474 includes a fractional indicator 480 and a units indicator 482. In this example, the fractional indicator 480 implements an alternative technique for representing fractional values. In some embodiments, the fractional display 474 may be implemented using a seven-segment display. As known in the art, seven segment displays typically are not capable of displaying a "slash" (e.g. "/") between the numerator and denominator (e.g., ½, ⅓, ¼) as would be required in order to display a fractional value using traditional notation. In order to display fractional representations of numbers, an alternative method for displaying the "slash" may be implemented. As an example of fractional representation 480, the "slash" may be represented by a horizontal line 485 or "dash" (e.g., "-") of which typical seven-segment displays are capable of displaying. In this example, the fractional number "1¼" could be represented on a seven-segment display as "1 1-4". And some embodiments, the "slash" could be represented by decimal point (e.g., ".") which most seven-segment displays are also capable of displaying. In such an implementation the fractional number "1¼" be represented on a seven-segment display as "1 1.4".

Figure 5:
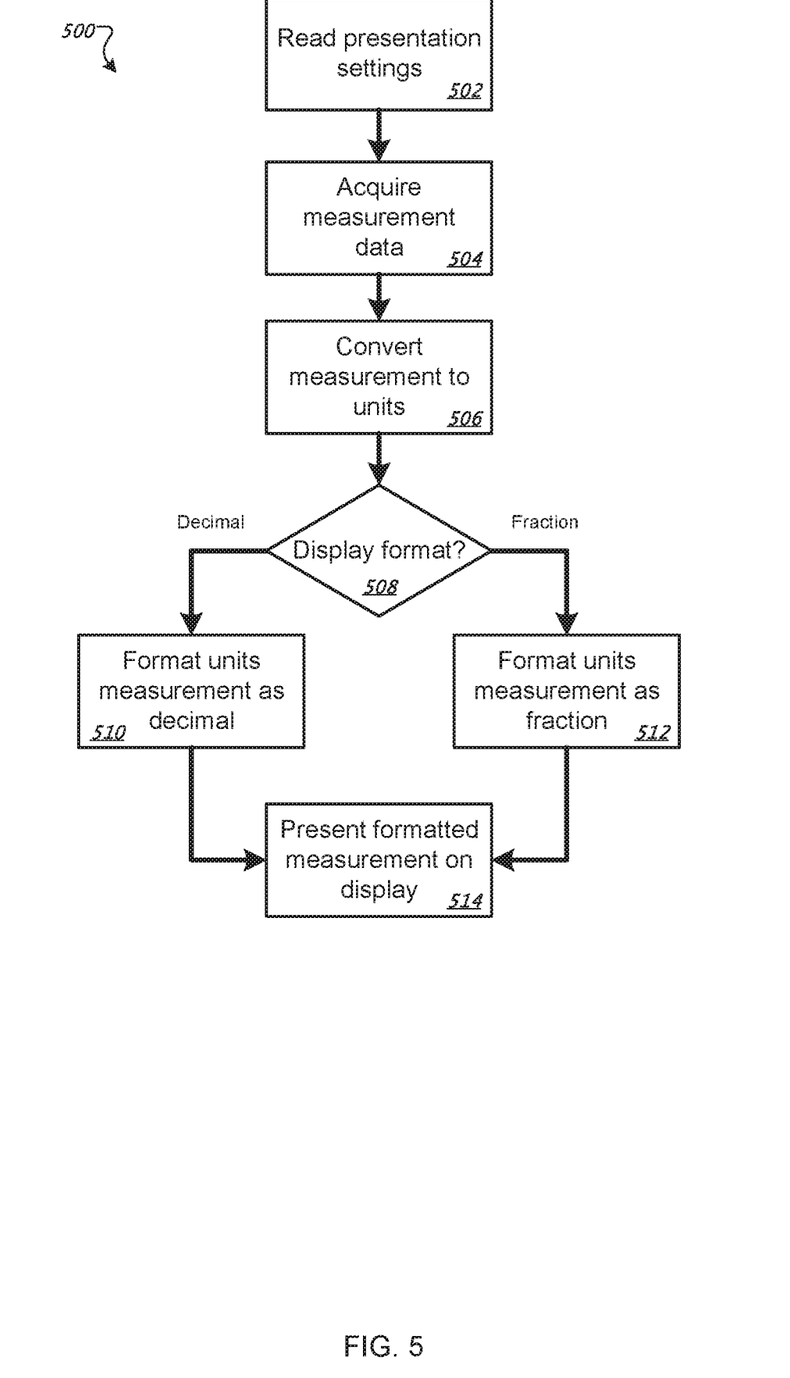
FIG. 5 illustrates a flow chart of exemplary operations of a display.

FIG. 5 Illustrates a flow chart 500 that represents some operations of the display 185. The display driver 185 may be executed individually or as a portion of a portion of a software process or module. In some implementations, execution of the display driver 185 may be initiated by an input (e.g., the user pressing a button) or may execute continuously upon power-up of the electronic package, or other type of event. In some implementations, the execution may be repeated for each available display (e.g., display 410 and display 412 shown in FIG. 4A). In this example, that the target display has been selected prior to the execution. At step 502, the display driver 185 reads presentation settings that control the display and format of measurement information (e.g. measurement units, decimal or fractional representation, etc.). These presentations settings may be gathered from inputs, from settings stored in memory (e.g., memory 180), configuration switches, etc.

At step 504, measurement data is acquired from the caliper's measurement hardware (e.g., encoders, transducers, etc.). In this example, the measurement data is given in an internal representation (e.g., a binary representation) that may not be directly useful to the user because it is not given in any standard unit of measurement. In step 506, this internal representation is converted to measurement units (e.g., inches, mm, etc.), according to the presentation settings read in step 502. Furthermore, one or more data format metrics may be selected. For example, the precision of the presented data may be selected (e.g., quarter inch precision, eighth inch precision, tenth of a centimeter precision, etc.) by a user or predefined. In some implementations, operations of the display driver 185 may include rule engine operations to apply the selected precision or one or more other data format metrics. For example, if a quarter inch precision is selected; and the caliper measures 7/16 of an inch; a numerical value of ½ of an inch may be assigned to represent the measurement.

At step 508, if the presentation settings call for the measurement to be formatted as a decimal value, the process continues at step 510. If the presentation settings call for the measurement to be formatted as a fractional value, the process continues at step 512. At step 510, the units measurement is formatted as a decimal value. At step 512, the units measurement is formatted as a fractional value. In some implementations, to simultaneously present representations on two displays (e.g., a decimal representation and a fractional representation), steps 510 and 512 are sequentially executed in two repetitive passes through the flow chart 500. In other implementations, steps 510 and 512 may be executed together for simultaneous presentation two displays (rather than in a repetitive manner for each display). For example a dedicated processor or processing engine may be assigned to each display and independently execute the operations of flow chart 500. Processing sharing and multitasking techniques may also be implemented for simultaneous displaying of the representations.

At step 514, the formatted measurement is presented to the display. This step may include sending raw characters to a display, sending drawing commands that represent the value to be displayed, etc. In some implementations, the operations of the display driver 185 may pass control back to another process, or one or more operations may be re-executed in a repetitive manner, or other operations may be executed.

Figure 6:
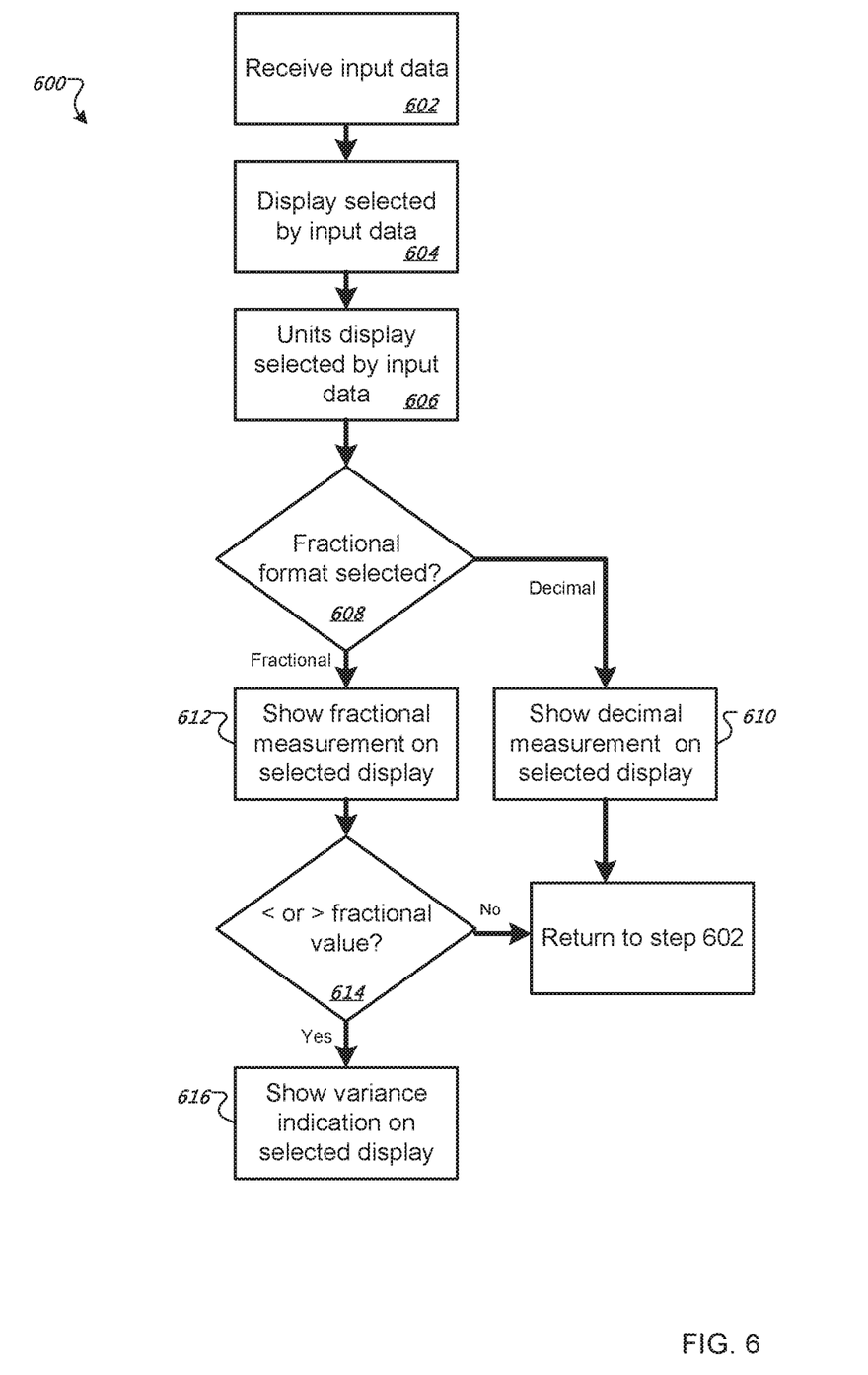
FIG. 6 illustrates a flow chart of exemplary operations of a display.

FIG. 6 illustrates a flow chart 600 of exemplary operations executed by the display driver 185 for displaying a fractional value with a variance indicator (such as variance indicator 330, or arrows 380 and 385). The display driver 185 may be executed independently or in combination with one or more other software processes or modules. In some implementations, execution of the display driver 185 may be initiated by an input (e.g., the user pressing a button) or may execute continuously upon power-up of the electronic package, or other type of event. In some implementations, the execution may be repeated for each available display (e.g., two displays). In this example, the target display has been selected prior to the process starting. However, in some implementations multiple displays may be selected. For example, operations associated with two or more instances of the display driver 185 may be executed by one or more processors or other types of processing engines.

At step 602, the process receives input data that includes data that represents the current position of the caliper (i.e. a measurement). In this example, the measurement data is given in an internal representation that may not be useful to the user (e.g., because it is not in any standard unit of measure). The input data may also comprise information concerning display selection, measurement units, fractional resolution, precision, etc.

At step 604, operations of the display driver 185 include selecting an individual display based upon information contained in the input data. At step 606, the display driver 185 selects the measurement units for the display based upon information also contained in the input data. In some implementations, this step may also include the process of converting measurement data from the internal representation to "real world" units (e.g., inches, mm, etc.).

At step 608 if input data indicates that a decimal format has been selected, then the process continues at step 610. At step 610, the process shows the decimal measurement on the selected display. In some implementations once this step has been completed, control may return back to the calling process. In some implementations, the process may return to step 602.

At step 608, if the input data indicates that the fractional format has been selected, then the process continues at step 612. At step 612, the process shows the fractional measurement on the selected display.

At step 614, the process determines whether the exact measurement value is greater than or less than the fractional value. If the exact measurement value is not greater than or less than the fractional value, the process returns to step 602, for example. In some implementations, such as those that have a variance indicator similar to that as illustrated by the variance indicator 330, this step may also include placing the highlighted segment 335 in a centered position.

If at step 614 the process determines that the exact measurement value is greater than or less than the fractional value, then the process continues at step 616. At step 616, the process shows the variance indication on the selected display after which may return to step 602.

In various implementations, the manner in which fractional resolution is determined may be implemented in various ways. For example, the minimum fractional resolution may be permanently set in the caliper according to fractional resolution that is found in common hand tools, such as 1/32 inch and 1/64 inch. In another example, the minimum fractional resolution may be configured by the user, which may be useful if the user knows that the objects being measured only fall within a known measurement resolution range (e.g., ¼ inch resolution for parts that measure ¼ inch, ½ inch, ¾ inch, etc., but are never ⅛ inch, ⅜ inch, 3/16 inch, etc.). The user may not be concerned with seeing measurements that correspond to common tool sizes, and may therefore wish to set the fractional resolution to value not commonly seen in hand tools (e.g., 1/128 inch, 1/20 inch, etc.).

There may be instances where the user may wish to represent fractional values in nonstandard formats. In some implementations, the caliper may be configured to allow for a fixed denominator value. For example, when measuring by ¼ inch increments, a fraction is usually simplified to an equivalent fraction in lowest terms (e.g. 0, ¼, ½, ¾, 1 . . . ). A user may configure the caliper to show fractions with a fixed denominator so measurements may not appear in lowest terms (e.g., 0/4, ¼, 2/4, ¾ 4/4 . . . ). In some embodiments, the caliper may also be configured to display fractional measurements using improper fractions (e.g., 5/4, 22/16, etc.).

In some embodiments, the caliper may also include an output for driving an external video display, such as a video monitor, television, head mounted display, etc. This output may be in the form of an analog video signal (e.g., modulated RF, composite video, super video, component video, VGA, etc.) and/or a digital video signal (e.g., IEEE1394, DVI-D, HDMI, etc.). In some embodiments, this external video display may take the place of any internal or attached display device previously described.

In some embodiments one or more processors, such as processor 175, may execute instructions to perform the operations of the caliper 100 or the caliper 200, e.g., respectively represented in flowchart 500 and 600. For example, one or more general processors (e.g., a microprocessor) and/or one or more specialized devices (e.g., an application specific integrated circuit (ASIC), etc.) may execute instructions. One or more of the processors may be implemented in a single integrated circuit as a monolithic structure or in a distributed structure. In some embodiments the instructions that are executed by the processors may reside in a memory (e.g., random access memory (RAM), read-only memory (ROM), static RAM (SRAM), etc.), such as memory 180. The instructions may also be stored on one or more mass storage devices (e.g., magnetic, magneto-optical disks, or optical disks, etc.).

One or more of the operations associated with the caliper 100 or the caliper 200 may be performed by one or more programmable processors (e.g., a microprocessor, an ASCI, etc.) executing a computer program. The execution of one or more computer programs may include operating on input data (e.g., data provided from a source, etc.) and generating output (e.g., sending data to a destination, etc.). The operations may also be performed by a processor implemented as special purpose logic circuitry (e.g., an FPGA (field programmable gate array), an ASIC (application-specific integrated circuit), etc.). Processors and memory can be supplemented by, or incorporated in special purpose logic circuitry.

Operation execution may also be executed by digital electronic circuitry, or in computer hardware, firmware, software, or in combinations of them. The operations described in flowcharts 500 and 600 (as well as the Display Driver 185) may be implemented as a computer program product, e.g., a computer program tangibly embodied in an information carrier, e.g., in a machine-readable storage device (e.g., RAM, ROM, hard-drive, CD-ROM, etc.) or in a propagated signal. The computer program product may be executed by or control the operation of, data processing apparatus, e.g., a programmable processor, a computer, or multiple computers. A computer program may be written in one or more forms of programming languages, including compiled or interpreted languages, and it can be deployed in any form, including as a stand-alone program or as a module, component, subroutine, or other unit suitable for use in a computing environment. A computer program may be deployed to be executed on one computing device (e.g., controller, computer system, etc.) or on multiple computing devices (e.g., multiple controllers) at one site or distributed across multiple sites and interconnected by a communication network.

One or more types of content presentation technologies may be used to implement the dual displays (such as display 126). For example, display devices that use light emitting diode (LED), a cathode ray tube (CRT), liquid crystal display (LCD), monitor, or other technologies may be implemented individually or in combination.

What is claimed is:

1. An apparatus comprising:
    a caliper configured to measure at least one physical dimension; and
    a display configured to present:
        a first representation and a second representation of the at least one physical dimension measured by the caliper, wherein a format of the first representation is different from a format of the second representation, and the first representation is simultaneously displayed with the second representation; and
        an approximate difference between the first representation and the second representation.

2. The apparatus of claim 1, wherein the first format has metric units and the second format has U.S. units.

3. The apparatus of claim 1, wherein the resolution of the first representation is selectable.

4. The apparatus of claim 1, wherein the format of the first representation includes a first measurement unit and the format of the second representation includes a second measurement unit that is different from the first measurement unit.

5. The apparatus of claim 1, further comprising:
    an electronics package that includes the display.

6. The apparatus of claim 1, wherein the display includes a unit indicator.

7. The apparatus of claim 1, wherein the display includes a variance indicator.

8. The apparatus of claim 1, wherein the format of the first representation includes one of a decimal format and a fractional format.

9. The apparatus of claim 8, wherein the format of the second representation includes one of a decimal format and a fractional format, and is different from the format of the first representation.

10. The apparatus of claim 1, further comprising:
    an electronics package configured to provide data representative of the first representation and the second representation to an external display module.

11. The apparatus of claim 10, wherein a hardwire connection provides the data from the electronics package to the external display module.

12. The apparatus of claim 10, wherein a wireless connection provides the data from the electronics package to the external display module.

13. A method comprising:
    simultaneously displaying on a display of a caliper, a first representation and a second representation of a measurement provided by the caliper, wherein a format of the first representation is different from a format of the second representation, and
    displaying, on the display of the caliper, an approximate difference between the first representation and the second representation.

14. The method of claim 13, further comprising:
    providing data that represents the first representation and the second representation to an external display module.

15. The method of claim 13, wherein the format of the first representation includes one of a decimal format and a fractional format.

16. The method of claim 13, wherein the first format has metric units and the second format has U.S. units.

17. A computer program product, encoded on a non-transitory computer-readable medium, operable to cause a data processing apparatus to perform operations comprising:
    simultaneously displaying on a display of a caliper, a first representation and a second representation of a measurement provided by the caliper, wherein a format of the first representation is different from the format of the second representation,
    wherein the display is configured to present an approximate difference between the first representation and the second representation.

18. The computer program product of claim 17, further operable to cause the data processing apparatus to perform operations comprising:
    providing data that represents the first representation and the second representation to an external di splay module.

19. The computer program product of claim 17, wherein the format of the first representation includes one of a decimal format and a fractional format.

20. The computer program product of claim 17, wherein the first format has metric units and the second format has U.S. units.

* * * * *

UNITED STATES PATENT AND TRADEMARK OFFICE
CERTIFICATE OF CORRECTION

| | |
|---|---|
| PATENT NO. | : 11,215,438 B2 |
| APPLICATION NO. | : 16/047628 |
| DATED | : January 4, 2022 |
| INVENTOR(S) | : Robert M. Stockman |

It is certified that error appears in the above-identified patent and that said Letters Patent is hereby corrected as shown below:

In the Claims

Column 10, Line 66, Claim 18, delete "di splay" and insert -- display --.

Signed and Sealed this
Thirty-first Day of May, 2022

Katherine Kelly Vidal
*Director of the United States Patent and Trademark Office*